(12) United States Patent
Tam et al.

(10) Patent No.: US 7,635,747 B2
(45) Date of Patent: *Dec. 22, 2009

(54) POLYMERIZATION OF CYCLIC AMIDES USING N-HETEROCYCLIC CARBENE AND METAL AMIDE AND METAL ALKOXIDE CATALYSTS

(75) Inventors: Wilson Tam, Boothwyn, PA (US); David T. Williamson, Hockessin, DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 566 days.

This patent is subject to a terminal disclaimer.

(21) Appl. No.: 11/269,966

(22) Filed: Nov. 9, 2005

(65) Prior Publication Data

US 2006/0096699 A1    May 11, 2006

Related U.S. Application Data

(60) Provisional application No. 60/626,185, filed on Nov. 9, 2004.

(51) Int. Cl.
*C08G 69/08* (2006.01)
(52) U.S. Cl. .............. 528/314; 528/315; 528/323; 528/326
(58) Field of Classification Search ............ 525/92; 528/314, 315.323, 326
See application file for complete search history.

(56) References Cited

U.S. PATENT DOCUMENTS 3,780,157 A * 12/1973 Hechlhammer et al ...... 264/310

FOREIGN PATENT DOCUMENTS

DE        19 53 899        5/1971

OTHER PUBLICATIONS

Baran et al Synthesis and ring-opening metathesis polymerization of eight-membered unsaturated lactams and related monomers, J. of Molecular catalyst, vol. 190, issues 1-2, pp. 109-116, Dec. 2, 2002.*
K. Ueda et al., Polymer Journal (1996) 28(5), pp. 446-451.
W. Memeger, Jr., et al., Macromolecules (1996), 29, 6475-6480.
K. Udipi et al., Polymer (1997), 28(4), pp. 927-938.
J. Sebenda, Prog. Polym., Sci., 1978, 6, pp. 123-167.
G. W. Nyce, In situ generation of carbenes: a general and versatile platform for organocatalytic living polymerization, J. Am. Chem., Soc. vol. 125, No. 10, 2003, pp. 3046-3056.
A. Klapars, E.A., J. Am., Chem., Soc., vol. 126, No. 11, 2004, pp. 3529-2533.
S. Eldred, E.A., {"Catalytic Transmidation under Moderate Conditions"., J. Am. Chem., Soc., vol. 125, No. 12, 2003, pp. 3422-3423.
J. Cheng, E.A., "Controlled Polymerization of beta-lactams using metal-amido cmplexes: Synthesis of block copoly(beta-peptides)", J. Am. Chem., Soc., vol. 123, No. 38, 2001, pp. 9457-9458.

* cited by examiner

*Primary Examiner*—James Seidleck
*Assistant Examiner*—Gregory Listvoyb
(74) *Attorney, Agent, or Firm*—Loretta F. Smith

(57) ABSTRACT

Mixtures or adducts of N-heterocyclic carbenes with metal amides or metal alkoxides are effective catalysts for the polymerization of cyclic amides. The catalysts are stable at polymerization temperatures, and the polymerization is rapid, resulting in high monomer conversion, high molecular weight, and a mechanically sound material.

20 Claims, No Drawings

POLYMERIZATION OF CYCLIC AMIDES USING N-HETEROCYCLIC CARBENE AND METAL AMIDE AND METAL ALKOXIDE CATALYSTS

This application claims the benefit of U.S. Provisional Application No. 60/626,185, filed Nov. 9, 2004, which is incorporated in its entirety as a part hereof for all purposes.

TECHNICAL FIELD

This invention relates to the ring opening polymerization of cyclic amides. More particularly, it relates to a genus of catalysts for such polymerizations that provide rapid polymerization with high monomer conversion, producing high molecular weight, mechanically sound polymer.

BACKGROUND

Ring opening polymerization of lactams is an important route to commercial polyamides such as nylon 6 and nylon 12. Initially, nylon 6 was produced by the ring-opening polymerization ("ROP") of $\epsilon$-caprolactam in the presence of small amounts of acid or water. Subsequently, anionic ROP was preferred, typically with sodium lactamate salt catalysts and isocyanate/lactam adducts as initiators. Grignard salts of $\epsilon$-caprolactam have also been used as catalysts for ROP of lactams [K. Ueda et al., *Polymer Journal* (1996), 28(5), 446-451], as have poly(aminophosphazenes) and protophosphatranes [W. Memeger, Jr. et al., *Macromolecules* (1996), 29, 6475-6480]. More information about the production of polyamides from anionic ROP of lactams is available in a variety of sources that include, for example, (i) H. Sekiguchi, "Lactams and Cyclic Imides," in *Ring-Opening Polymerization*, K. J. Ivin and T. Saegusa, eds., Elsevier Applied Science Publishers Ltd., Essex, England, vol. 2 (1984), Ch. 12, 809-918; (ii) K. Udipi et al., *Polymer* (1997), 38(4), 927-938; (iii) R. S. Davé et al., Ibid., 939-947; (iv) R. S. Davé et al., *Ibid.*, 949-954; and (v) J. Sebenda, *Prog. Polym. Sci.* (1978), 6, 123-167.

Macrocyclic amides can be formed as minor byproducts in the production of linear polyamides. For example, when hexamethylene diamine and adipic acid are polymerized to make nylon 66, cyclic species are produced at a level of about 1.5%: cyclic unimer, cyclic dimer, cyclic trimer, and traces of higher cyclic oligomers. Macrocyclic aromatic amides are also known and have been synthesized under dilute reaction conditions. Flexible linkages and kinks increase the propensity to form macrocyclics [W. Memeger, Jr., "Macrocyclic Aramids" in *Polymeric Materials Encyclopedia*, J. C. Salamone editor-in-chief, CRC Press, Inc., Boca Raton, Fla. (1996), 3873-3882].

Linear polyamides may be fabricated into articles of manufacture by a number of known techniques including extrusion, compression molding, and injection molding. However, lactams and macrocyclic amides have unique properties that make them attractive as matrices for engineering thermoplastic composites. The desirable properties stem from the fact that lactams and macrocyclic amides exhibit low melt viscosity, allowing them easily to impregnate a dense fibrous preform followed by polymerization to polyamides. Upon melting and in the presence of an appropriate catalyst, polymerization and crystallization can occur virtually isothermally.

There thus remains a need for an effective and efficient high-temperature process for preparing linear polyamides from cyclic amides.

SUMMARY

One embodiment of this invention is a process for preparing a thermoplastic polyamide comprising contacting at least one cyclic amide with a mixture or an adduct of components (a) and (b) as described below wherein:

(a) includes any one or more members of the group of N-heterocyclic carbene-containing catalysts described by any of the Formulae I, II and/or III:

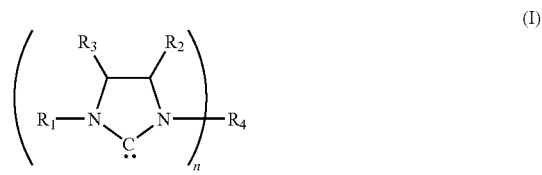

(I)

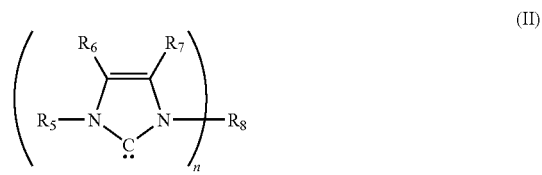

(II)

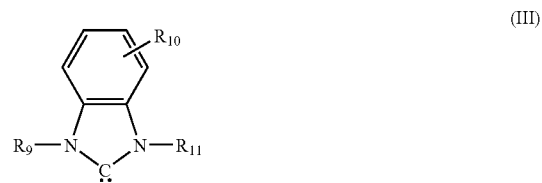

(III)

wherein:

$R_1$, $R_5$, $R_9$ and $R_{11}$ are each independently an adamantyl, alkaryl, or alkyl group;

$R_2$, $R_3$, $R_6$, $R_7$ and $R_{10}$ are each independently hydrogen or a $C_{1-12}$ alkyl group;

n=1 or 2;

$R_4$ is the same as $R_1$ when n=1, and is an alkylene group when n=2;

$R_8$ is the same as $R_5$ when n=1, and is an alkylene group when n=2; and (b) includes any one or more members of the group of compounds described by any of the Formulae IV, V, VI, VII and/or VIII:

(IV)

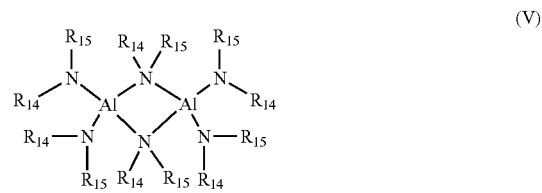

(V)

-continued

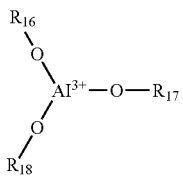

(VI)

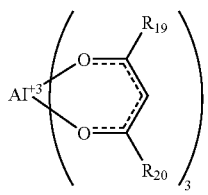

(VII)

Ti(OR$_{21}$)$_4$ (VIII)

wherein

R$_{12}$, R$_{13}$, R$_{14}$ and R$_{15}$ are each independently a C$_{1-12}$ aliphatic hydrocarbyl or substituted aliphatic hydrocarbyl group; and R$_{16}$, R$_{17}$, R$_{18}$, R$_{19}$, R$_{20}$ and R$_{21}$ are each independently a C$_{1-12}$ alkyl group.

In a further embodiment of this invention, articles are produced using a cyclic amide material (with or without fillers) by polymerizing it in the process of forming the article, using processes including without limitation injection and rotational molding, resin film infusion, resin transfer molding, filament winding, powder coating to create a prepreg or film, hot melt prepreg preparation, compression molding, roll wrapping, and pultrusion; and all of these optionally with reinforcement.

DETAILED DESCRIPTION

In the context of this disclosure, a number of terms shall be utilized.

As used herein, the term "cyclic amide" denotes a cyclic molecule having at least one ring in its molecular structure containing at least one identifiable amide functional repeat unit. The amide functional unit is typically —NH—C(O)— but N-substitution is also possible, with, for example, a C$_{1-12}$ alkyl group. The cyclic amide may be an oligomer.

As used herein, the term "mixture" denotes a physical combining of at least two substances, which may or may not react with each other.

The term "adduct" as used herein refers specifically to a coordination compound XY formed from a compound X that donates an electron pair to a metal center in compound Y.

As used herein, the term "N-heterocyclic carbene" denotes a closed ring system containing at least one nitrogen ring atom and a ring atom that is a divalent carbon.

As used herein, the term "adamantyl" means the radical formed by the loss of a hydrogen atom from adamantane (C$_{10}$H$_{16}$). The 2-isomer is shown below:

As used herein, a "macrocyclic" molecule means a cyclic molecule having at least one ring within its molecular structure that contains 8 or more atoms covalently connected to form the ring.

As used herein, an "oligomer" means a molecule that contains 2 or more identifiable structural repeat units of the same or different formula.

As used herein, "an alkyl group" means a univalent group derived from an alkane by removing a hydrogen atom from any carbon atom: —C$_n$H$_{2n+1}$ where n≧1.

As used herein, "a cycloalkyl group" means a cyclic alkyl group, —C$_n$H$_{2n+1-x}$, where x represents the number of H's replaced by cyclization(s).

As used herein, "an alkylene group" means a divalent group —C$_n$H$_{2n}$— where n≧1.

As used herein, "a divalent aromatic group" means an aromatic group with links to other parts of the cyclic molecule. For example, a divalent aromatic group may include a meta- or para-linked monocyclic aromatic group. Examples are the meta- and para-phenylene groups,

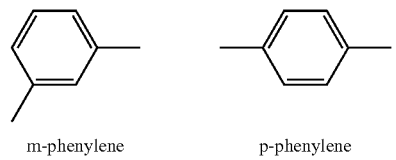

m-phenylene    p-phenylene

As used herein, "a polyamide composite" means a polyamide that is associated with another substrate such as a fibrous or particulate material. Illustrative examples of particulate material are chopped fibers, glass microspheres and crushed stone. Certain fillers and additives thus can be used to prepare polyamide polymer composites. The term "fibrous material" or "fibrous substrate" means a more continuous substrate, e.g., fiberglass, ceramic fibers, carbon fibers or organic polymers such as aramid fibers.

As used herein, "wet-out" means a process to cause a physical state of good and sustained contact between a liquid substrate and a solid substrate such that no substantial amount of air or other gas is trapped between the liquid substrate and the solid substrate.

As used herein, "fiber" means any material with slender, elongated structure such as polymer or natural fibers. The material can be fiberglass, ceramic fibers, carbon fibers or organic polymers such as aramid fibers.

As used herein, a fiber "tow" or "strand" is a group of fibers together, or a bundle of fibers, which are usually wound onto spools and may or may not be twisted.

As used herein, a "fiber preform" is an assembly of fiber tows and/or fabric held together in a desired shape.

As used herein, a "prepreg" is a fiber material, such as carbon, glass or other fiber, that has been impregnated with a resin material in sufficient volume as to provide the matrix of the composite, and such that the ratio of fiber to resin is closely controlled. The fiber configuration can be in tow form, woven or knitted into a fabric, or in a unidirectional tape.

It has been found that mixtures or adducts of compounds containing N-heterocyclic carbene with metal amides or metal alkoxides effectively catalyze the ring-opening polymerization of cyclic amides. Such catalysts are stable at the temperatures required for polymerization, and result in high monomer conversion, high molecular weight, and a mechanically sound material. The polymerization is rapid, with a high degree of conversion possible in five to sixty minutes.

Cyclic amides that may be employed in this invention may be aliphatic or may include one or more divalent aromatic groups, subject to the proviso that the melting point be less than about 260° C.

Suitable aliphatic cyclic amides include, but are not limited to:

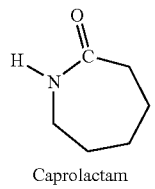

Caprolactam

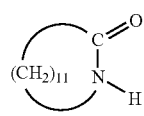

Lactam-12

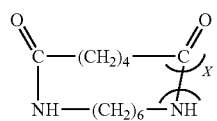

X=1: nylon 66 unimer. X=2: nylon 66 dimer

Some examples of suitable cyclic amides containing at least one aromatic ring are:

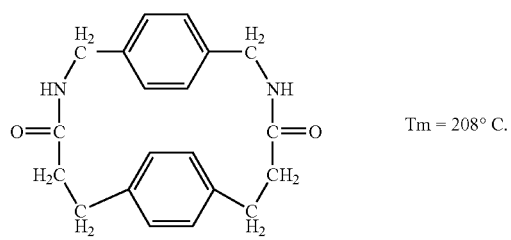

Tm = 208° C.

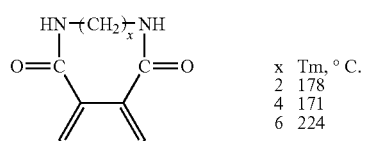

| x | Tm, ° C. |
|---|---|
| 2 | 178 |
| 4 | 171 |
| 6 | 224 |

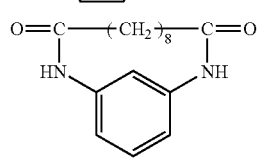

Tm = 245° C.

-continued

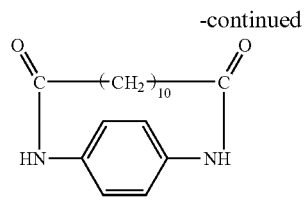

Tm = 208° C.

Cyclic amides can also be obtained through extraction from linear polyamides such as nylon 6 and nylon 66, for example, with ethanol, and analyzed by gas chromatography [see, e.g., S. Mori, M. Furusawa, and T. Takeuchi, Analytical Chemistry (1970), 42(6), 661-662)].

It is also within the scope of the invention to employ cyclic co-amides or a mixture of at least two different cyclic amides to produce copolyamides. Therefore, unless otherwise stated, an embodiment of a composition, article, or process that refers to cyclic amides also includes embodiments utilizing cyclic co-amides and embodiments utilizing a mixture of at least two different cyclic amides.

In one embodiment of this invention, the N-heterocyclic carbene-containing catalyst in the mixture or adduct may be a compound of the formula

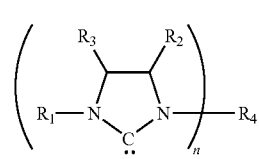

(I)

wherein:

$R_1$ is an adamantyl, alkyl, or cycloalkyl group;

$R_2$ and $R_3$ are each independently hydrogen or a $C_{1-12}$ alkyl group;

n equals 1 or 2; and $R_4$ equals $R_1$ when n equals 1, and is an alkylene group when n equals 2.

Preferred are compounds in which $R_1$ is adamantyl, $R_2$ and $R_3$ are hydrogen, and $R_4=R_1$. Non-limiting illustrative examples of Formula I are:

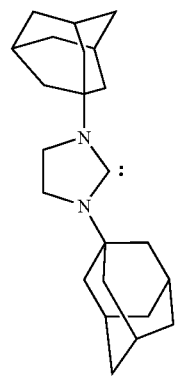

1,3-bis(1-adamantyl)-4,5-dihydroimidazol-2-ylidene and

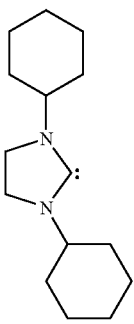

1,3-bis(cyclohexyl)-4,5-dihydroimidazol-2-ylidene

In another embodiment of the present invention, the N-heterocyclic carbene-containing catalyst in the mixture or adduct may be a compound of the formula

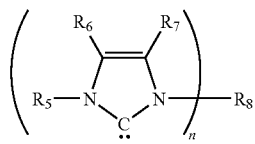

(II)

wherein
$R_5$ is an adamantyl, alkyl, or cycloalkyl group;
$R_6$ and $R_7$ are each independently hydrogen or a $C_{1-12}$ alkyl group;
n equals 1 or 2; and
$R_8$ equals $R_5$ when n equals 1, and is an alkylene group when n equals 2.

Preferred are compounds in which $R_5$ is adamantyl, $R_6$ and $R_7$ are hydrogen, and $R_8=R_5$.

Non-limiting illustrative examples of compounds of Formula II are:

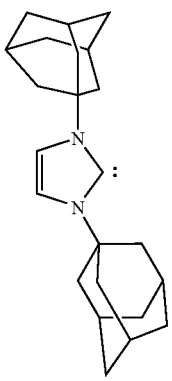

1,3-di-1-adamantyl-imidazole-2-ylidene and

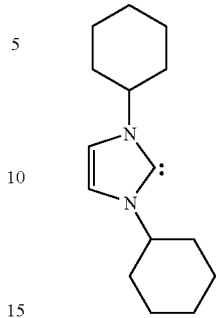

1,3-bis(cyclohexyl)-imidazol-2-ylidene

In yet another embodiment of the present invention, the N-heterocyclic carbene-containing catalyst in the mixture or adduct may be a compound of the formula

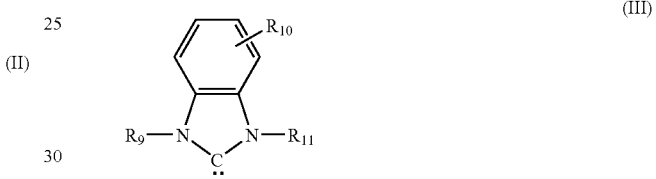

(III)

wherein
$R_9$ and $R_{11}$ are each independently an adamantyl or alkyl group, and
$R_{10}$ is hydrogen or a $C_{1-12}$ alkyl group.

Preferred are compounds in which $R_9=R_{11}$=adamantyl and $R_{10}$ is hydrogen.

Carbenes specified by Formula III are described in Cetinkaya, E.; Hitchcock, P. B.; Kuecuekbay, H.; Lappert, M. F.; Al-Juaid, S.; J. Organometallic Chemistry (1994), 481, 89-95; and in Teles, J. H.; Melder, J.-P.; Ebel, K.; Schneider, R.; Gehrer, E.; Harder, W.; Brode, S.; and Enders, D.; Breuer, K.; Raabe, G.; Helvetica Chimica Acta (1996), 79(1), 61-83.

In one embodiment of this invention, component (b) of the catalyst mixture or adduct may be a compound described by the formula

(IV)

wherein $R_{12}$ and $R_{13}$ are each independently a $C_{1-12}$ aliphatic hydrocarbyl or substituted aliphatic hydrocarbyl group. Preferred compounds are those wherein $R_{12}=R_{13}$=methyl or ethyl.

In another embodiment of this invention, component (b) of the catalyst mixture or adduct may be a compound described by the formula

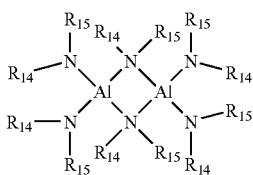

(V)

wherein $R_{14}$ and $R_{15}$ are each independently a $C_{1-12}$ aliphatic hydrocarbyl or substituted aliphatic hydrocarbyl group. Preferred compounds are those wherein $R_{14}=R_{15}=$methyl or ethyl.

In another embodiment of this invention, component (b) of the catalyst mixture or adduct may be a compound described by the formula

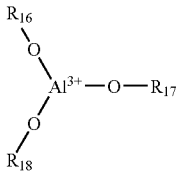

(VI)

wherein $R_{16}$, $R_{17}$ and $R_{18}$ are each independently a $C_{1-12}$ alkyl group. Typically, $R_{16}=R_{17}=R_{18}$. An example is the case where $R_{16}=R_{17}=R_{18}=$isopropyl.

In another embodiment of this invention, component (b) of the catalyst mixture or adduct may be a compound described by the formula

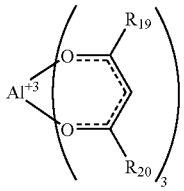

(VII)

wherein $R_{19}$ and $R_{20}$ are each independently a $C_{1-12}$ alkyl group. Typically, $R_{19}=R_{20}$. One such example is aluminum acetylacetonate, in which $R_{19}=R_{20}=$methyl.

In another embodiment of this invention, component (b) of the catalyst mixture or adduct may be a compound described by the formula $$Ti(OR_{21})_4 \quad (VIII)$$

wherein $R_{21}$ is a $C_{1-12}$ alkyl group. Two suitable examples of a compound of Formula VIII are titanium isopropoxide (CAS number 546-68-9), wherein $R_{21}$ is an isopropyl group; and tetrabutyl titanate (CAS 55-93-70-4}, wherein $R_{21}$ is an n-butyl group.

The polymerization reaction is carried out at an elevated temperature, at which the cyclic amide is molten, by heating to a temperature at which the polymerization occurs. This is typically in the range of about 190 to about 280° C. The cyclic amide is heated to above its melting point so it becomes less viscous and can be manipulated more easily in processing. Stirring may be employed under an inert atmosphere.

An initiator may also be present, such as an aliphatic amine or alcohol. The polymerization reaction may be carried out with or without a solvent. A solvent may be used to dissolve one or more of the reactants and/or to mix the reactants. A solvent may also be used as a medium in which the reaction is carried out. Illustrative solvents that may be used include high-boiling compounds such as o-dichlorobenzene and meta-terphenyl. In a preferred embodiment, no solvent is used in the polymerization reaction.

The total amount of catalyst used is typically in the range of 500 to 10,000 ppm by total weight of the mixture formed with the cyclic amide that is used. The ratio of component (a) to component (b) in the mixture or adduct is preferably about 1:1 but can vary from about 1:4 to about 10:1.

The components (a) and (b) may be added to the reaction vessel individually, as a physical mixture (as powders, for example), or as a separately produced adduct. As an example of the latter, 1,3-di-1-adamantyl-imidazole-2-ylidene and aluminum isopropoxide were heated together in toluene until a clear solution resulted. NMR evidence indicated an adduct, 1,3-di-1-adamantyl-imidazole-2-ylidene-tris-(isopropoxide) aluminum, had formed, which could then be used as a catalyst for a ring-opening polymerization reaction.

In one aspect of the invention, articles are produced using a cyclic amide material (with or without fillers) by polymerizing it in the process of forming the article, using processes including without limitation injection and rotational molding, resin film infusion, resin transfer molding, filament winding, powder coating to create a prepreg or film, hot melt prepreg preparation, compression molding, roll wrapping, and pultrusion; and all of these optionally with reinforcement. The only proviso is that conditions allow for the polymerization of the cyclic amide to form high molecular weight polyamide; that is, the cyclic amide should be heated at least to its melting point. Generally, most of such processes require that the resin to be processed have a low melt viscosity; therefore, cyclic amides that have low melt viscosity are particularly suitable for such processing.

For example, a molding process for manufacturing articles from cyclic amide includes placing in a mold at least one cyclic amide, and a mixture or adduct formed from any one or more of the catalysts described by any of the Formulae I, II and/or III, and any one or more of the catalytic compounds described by any of the Formulae IV, V, VI, VII and/or VIII, and heating the contents of the mold to a temperature high enough for polymerization of the amide oligomer to take place. This is above the melting point of the oligomer, typically in the range of about 180 to about 280° C. Molten oligomer and catalyst can be injected into the mold at much lower pressure than the 5,000 to 20,000 psi typical of injection molding processes because of the low viscosity of the molten oligomer.

In compression molding, the oligomer(s) and catalyst(s) are placed between a top die and a lower die within a press. The oligomer(s) and catalyst(s) are typically loaded onto a fibrous base material. The dies of the mold are pressed together with enough pressure to evenly fill the mold, and the mold contents are heated to a high enough temperature for polymerization to take place. Compression molding is used for making plastic composite parts that are thin and generally flat with mild features and contours such as truck and auto body panels, bumper beams, various trays and machine housings.

In rotational molding, the molding process additionally comprises rotating the mold about two axes simultaneously, so that the contents roll over the intended areas of the inside of the mold, beginning the rotation before the contents are heated, and continuing to rotate the mold until the content polymerizes and solidifies. Rotational molding is a process for making hollow thermoplastic articles, such as a wide variety of fluid storage tanks, tractor fenders and large children's toys.

In resin film infusion, a layer or film of the cyclic amide(s) containing the catalyst(s) is placed in the mold adjacent to a dry layer of fibrous material, and, when the contents of the mold are heated, the oligomer(s) and catalyst(s) are forced to infuse into the dry layer of fibrous material. Resin film infusion is a process for making plastic composite articles that are predominantly flat on one face and may have detailed features. An illustrative example of such articles is aircraft wing skins which are typically constructed of a composite made with carbon fiber and epoxy resin.

The compositions and methods of the invention may be used to manufacture articles of various sizes and shapes from various cyclic amides. Exemplary articles that may be manufactured by the invention include without limitation automotive body panels and chassis components, bumper beams, aircraft wing skins, windmill blades, fluid storage tanks, tractor fenders, tennis rackets, golf shafts, windsurfing masts, toys, rods, tubes, bars stock, bicycle forks, and machine housings.

In the manufacture of an article, one or more of various types of fillers may be included. A particular filler often is included to achieve a desired purpose or property, and may be present in the resulting polyamide polymer. For example, the purpose of the filler may be to increase the strength of the polyamide polymer product. Boron nitride is used as a filler in applications that require high levels of heat conductivity and low levels of electrical conductivity. A filler also may provide weight or bulk to achieve a particular density, be a substitute for a more expensive material, and/or provide other desirable properties as recognized by the artisan.

Illustrative examples of fillers are, among others, fumed silica, titanium dioxide, calcium carbonate, chopped fibers, fly ash, glass microspheres, micro-balloons, crushed stone, nanoclay, linear polymers, and monomers. A filler may be added before, during or after the polymerization reaction. The filler is added generally in an amount between about 0.1% and 70% by weight of the weight of the total mixture (i.e., oligomer plus catalyst plus filler plus any other additives that may be present), depending on the filler and the purpose for adding the filler. For example, the percentage is preferably between 25% and 50% by weight in the case of calcium carbonate, between 2% and 5% by weight in the case of nanoclays, and between 25% and 70% by weight in the case of glass microspheres. Fillers can be used to prepare polyamide polymer composites.

Furthermore, in the manufacture of an article, additional components (e.g., additives) may be added. Illustrative additives include colorants, pigments, magnetic materials, antioxidants, UV stabilizers, plasticizers, flame retardants, lubricants, and mold releases.

Where a range of numerical values is recited herein, unless otherwise stated, the range is intended to include the endpoints thereof, and all integers and fractions within the range. It is not intended that the scope of the invention be limited to the specific values recited when defining a range.

EXAMPLES

The present invention is further defined in the following Examples. It should be understood that these Examples, while indicating preferred embodiments of the invention, are given by way of illustration only. From the above discussion and these Examples, one skilled in the art can ascertain the essential characteristics of this invention, and without departing from the spirit and scope thereof, can make various changes and modifications of the invention to adapt it to various uses and conditions.

The meaning of abbreviations is as follows: "min" means minute(s), "g" means gram(s), "mg" means milligram(s), "mmol" means millimole(s), "ml" means milliliter(s), "$M_n$" means number average molecular weight, "$M_w$" means weight average molecular weight, "PDI" means polydispersity index and equals $M_w/M_n$, "DSC" means differential scanning calorimetry, "NMR" means nuclear magnetic resonance, and "GPC" means gel permeation chromatography.

Experimental

Materials.

Bis(μ-dimethylamino)tetrakis(dimethylamino) dialuminum ("Aluminum amide", CAS # 32093-39-3, 95%) and aluminum isopropoxide (CAS# 555-31-7, 98%) were obtained from Strem Chemicals, Inc. (Newburyport, Mass.) and were used as received. Titanium (IV) isopropoxide (CAS # 546-68-9), tetrakis(dimethylamino)titanium (CAS # 3275-24-9) and caprolactam (CAS # 105-60-2) were obtained from Aldrich Chemical Company (Milwaukee, Wis.) and were used as received.

The N-heterocyclic carbenes were prepared as described in M. Niehues, G. Kehr, G. Erker, B. Wibbeling, R. Frohlich, O. Blacque, H. Berke, J. Organometallic Chem., 2002, Vol. 663, pp. 192-203; in W. A. Herrmann, C. Kocher, L. J. Goozen, and G. R. J. Artus, Chem. Eur. J. 1996, p. 1627; and in A. J. Arduengo, III, R. Krafczyk, R. Schmutzler, H. A. Craig, J. R. Goerlich, W. J. Marshall, M. Unverzagt, Tetrahedron, 1999, Vol. 55, pp. 14523-14534. 1,3-di-1-adamantyl-imidazole-2-ylidene-tris-(isopropoxide) aluminum was prepared by adding the carbene 1,3-di-1-adamantyl-imidazole-2-ylidene to aluminum isopropoxide in toluene and heating until a clear solution resulted. NMR indicated that an adduct of the two was formed.

Polymer Characterization.

A size exclusion chromatography system comprised of a Model Alliance 2690™ from Waters Corporation (Milford, Mass.), with a Waters 410™ refractive index detector (DRI) and Viscotek Corporation (Houston, Tex.) Model T-60A™ dual detector module incorporating static right angle light scattering and differential capillary viscometer detectors, was used for molecular weight characterization. The mobile phase was 1,1,1,3,3,3-hexafluoro-2-propanol (HFIP) with 0.01 M sodium trifluoroacetate. The dn/dc was measured for the polymers, and it was assumed that all of the sample was completely eluted during the measurement.

Example 1

Polymerization of caprolactam using 1,3-di-1-adamantyl-imidazole-2-ylidene and tetrakis(dimethylamino)titanium A vial was charged with 0.033 g of tetrakis(dimethylamino)titanium, 1 mL of toluene, and 0.050 g of 1,3-di-1-adamantyl-imidazole-2-ylidene. The solvent was removed under vacuum. To the residue was added 500 mg of caprolactam. The mixture was then placed in a hot block at 200° C. After 5 minutes, a hard brown solid formed. GPC analysis indicated Mn of 23,700 and Mw of 59,700, with conversion of 84%.

Example 2

Polymerization of caprolactam using 1,3-di-1-adamantyl-imidazole-2-ylidene and titanium (IV) isopropoxide A solution was prepared from 25 mg 1,3-di-1-adamantyl-imidazole-2-ylidene, 21 mg titanium (IV) isopropoxide in 0.3 mL toluene. The solvent was removed under vacuum and 500 mg of caprolactam was added. The mixture was then placed in a 200° C. hot block for 15 minutes. GPC analysis indicated $M_n$ of 63,300 and $M_w$ of 134,700 with 91% conversion.

Example 3

Polymerization of caprolactam using 1,3-bis(cyclohexyl)-imidazol-2-ylidene and tetrakis(dimethylamino)titanium A mixture of 20 mg of 1,3-bis(cyclohexyl)imidazol-2-ylidene, 20 mg of tetrakis(dimethylamino)titanium and 1.11 g of caprolactam was placed in a 200° C. hot block for 33 min. GPC analysis indicated $M_n$ of 16,900 and $M_w$ of 21,700, with conversion of 76%.

Example 4

Polymerization of caprolactam using aluminum isopropoxide and 1,3-di-1-adamantyl-imidazole-2-ylidene at a monomer to catalyst ratio of 80:1

Aluminum isopropoxide (0.113 g, 0.552 mmol), 1,3-di-1-adamantyl-imidazole-2-ylidene (0.185 g, 0.552 mmol) and toluene (20 mL) were combined in a scintillation vial and heated to 60° C. A soluble green complex was formed. The toluene was removed in vacuo. Caprolactam (5 g, 44.2 mmol) was added to the vial, and the reaction mixture was heated at 200° C. for 4 h. GPC analysis indicated $M_n$ of 65,700 and PDI of 2.14.

Example 6

Polymerization of caprolactam using aluminum isopropoxide and 1,3-di-1-adamantyl-imidazole-2-ylidene at a monomer to catalyst ratio of 160:1

Aluminum isopropoxide (0.056 g, 0.276 mmol), 1,3-di-1-adamantyl-imidazole-2-ylidene (0.093 g, 0.276 mmol) and toluene (20 mL) were combined in a scintillation vial and heated to 60° C. A soluble green complex was formed. The toluene was removed in vacuo. Caprolactam (5 g, 44.2 mmol) was added to the vial, and the reaction mixture was heated at 200° C. for 4 h. GPC analysis indicated $M_n$ of 147,700 and PDI of 2.63

Example 7

Polymerization of caprolactam using aluminum isopropoxide and 1,3-di-1-adamantyl-imidazole-2-ylidene at a monomer to catalyst ratio of 320:1

Aluminum isopropoxide (28.21 mg, 0.138 mmol), 1,3-di-1-adamantyl-imidazole-2-ylidene (46.3 mg, 0.138E mmol) and toluene (20 mL) were combined in a scintillation vial and heated to 60° C. A soluble green complex was formed. The toluene was removed in vacuo. Caprolactam (5 g, 44.2 mmol) was added to the vial, and the reaction mixture was heated at 200° C. for 4 h. GPC analysis indicated $M_n$ of 93,900 and PDI of 2.01

Example 8

Polymerization of caprolactam using aluminum isopropoxide and 1,3-di-1-adamantyl-imidazole-2-ylidene at a monomer to catalyst ratio of 1280:1

Aluminum isopropoxide (7.1 mg, 0.0345 mmol), 1,3-di-1-adamantyl-imidazole-2-ylidene (12 mg, 0.0345 mmol) and toluene (20 mL) were combined in a scintillation vial and heated to 60° C. A soluble green complex was formed. The toluene was removed in vacuo. Caprolactam (5 g, 44.2 mmol) was added to the vial, and the reaction mixture was heated at 200° C. for 4 h. GPC analysis indicated $M_n$ of 97,000 and PDI of 2.05

Example 9

Polymerization of caprolactam in the presence of a boron nitride filler using aluminum isopropoxide and 1,3-di-1-adamantyl-imidazole-2-ylidene Aluminum isopropoxide (28.21 mg, 0.138 mmol), 1,3-di-1-adamantyl-imidazole-2-ylidene (46.3 mg, 0.138 mmol) and toluene (20 mL) were combined in a scintillation vial and heated to 60° C. A soluble green complex was formed. The toluene was removed in vacuo. Caprolactam (5 g, 44.2 mmol) and boron nitride (1.5 g) were added to the vial and the reaction mixture was heated at 200° C. for 1 h. GPC analysis indicated $M_n$ of 50,600 and PDI of 1.83

Example 10

Polymerization of caprolactam using aluminum isopropoxide and 1,3-di-1-adamantyl-imidazole-2-ylidene with a ratio of aluminum isopropoxide to 1,3-di-1-adamantyl-imidazole-2-ylidene of 1:10

Aluminum isopropoxide (1.4 mg, 0.0063 mmol), 1,3-di-1-adamantyl-imidazole-2-ylidene (22 mg, 0.0626 mmol) and toluene (20 mL) were combined in a scintillation vial and heated to 60° C. A soluble green complex was formed. The toluene was removed in vacuo. Caprolactam (5 g, 44.2 mmol) was added to the vial, and the reaction mixture was heated at 200° C. for 1 h. GPC analysis indicated $M_n$ of 5,280 and PDI of 1.95

What is claimed is:

1. A process for preparing a thermoplastic polyamide comprising contacting at least one cyclic amide with a mixture or an adduct of components (a) and (b), wherein (a) and (b) are as described below:

(a) any one or more of the N-heterocyclic carbene-containing catalysts described by any of the Formulae I, II and/or III:

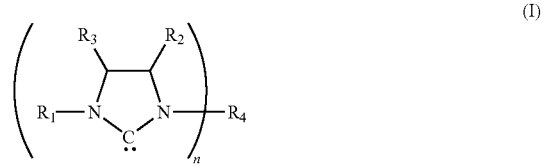

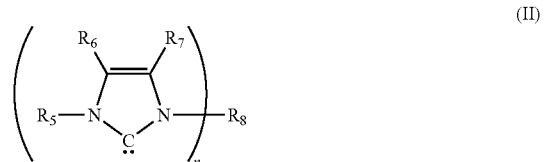

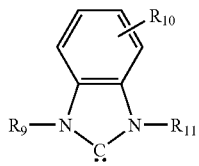
(III)

wherein:
$R_1$, $R_5$, $R_9$ and $R_{11}$ are each independently an adamantyl, alkaryl, or alkyl group;
$R_2$, $R_3$, $R_6$, $R_7$ and $R_{10}$ are each independently hydrogen or a $C_{1-12}$ alkyl group;
n=1 or 2;
$R_4$ is the same as $R_1$ when n=1, and is an alkylene group when n=2;
$R_8$ is the same as $R_5$ when n=1, and is an alkylene group when n=2; and
$R_{10}$ is hydrogen or a $C_{1-12}$ alkyl group; and
(b) any one or more of the compounds described by any of the Formulae IV, V, VI, VII and/or VIII:

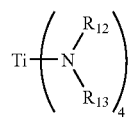
(IV)

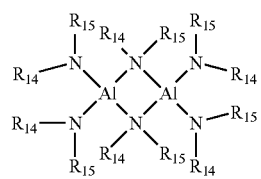
(V)

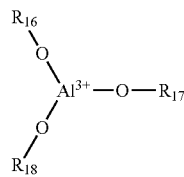
(VI)

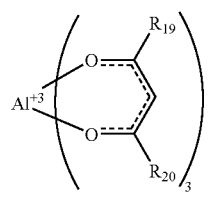
(VII)

$$Ti(OR_{21})_4 \quad (VIII)$$

$R_{12}$, $R_{13}$, $R_{14}$ and $R_{15}$ are each independently a $C_{1-12}$ aliphatic hydrocarbyl or substituted aliphatic hydrocarbyl group; and
$R_{16}$, $R_{17}$, $R_{18}$, $R_{19}$, $R_{20}$ and $R_{21}$ are each independently a $C_{1-12}$ alkyl group; and
wherein the ratio of component (a) to component (b) is in the range of from about 1:4 to about 10:1.

2. The process of claim 1, which is carried out at a temperature of about 180 to about 280° C.

3. The process of claim 1, wherein a cyclic amide is contacted with a mixture or an adduct of components (a) and (b) in the presence of a filler.

4. The process of claim 3, wherein the filler is present in an amount of about 0.1 to about 70% of the total weight of the mixture of cyclic amide plus catalyst plus filler plus any other additives present.

5. The process of claim 3, wherein the filler is at least one member of the group consisting of boron nitride, fumed silica, titanium dioxide, calcium carbonate, chopped fibers, fly ash, glass microspheres, micro-balloons, crushed stone, nanoclay, linear polymers, and monomers.

6. The process of claim 1, wherein the contacting at least one cyclic amide with a mixture or an adduct of components (a) and (b), is performed in a mold to provide a molded article.

7. The process of claim 1, wherein the contacting at least one cyclic amide with a mixture or an adduct of components (a) and (b), is performed in the presence of a fibrous base material to provide a prepeg.

8. The process of claim 7, wherein the fibrous base material is in the form of a sheet or a tape of reinforcing fibers.

9. The process of claim 1, wherein the contacting at least one cyclic amide with a mixture or an adduct of components (a) and (b), is performed in the presence a fibrous strand.

10. The process of claim 8, wherein the contacting occurs in a die.

11. The process of claim 6, wherein the cyclic amide is molten and is injected into the mold.

12. The process of claim 6, further comprising the step of rotating the mold about two axes simultaneously, so that the contents roll over the intended areas of the inside of the mold, beginning the rotation before the contents are heated, and continuing to rotate the mold until the content polymerizes and solidifies.

13. The process of claim 6, wherein a layer or film of the cyclic amide comprising the catalyst(s) is placed in the mold adjacent to a dry layer of fibrous material, and, when the contents of the mold are heated, the cyclic amide and catalyst(s) are forced to infuse into the dry layer of fibrous material.

14. The process of claim 6, wherein the mold contains a fibrous preform, and the cyclic amide and catalyst(s) are forced into the preform.

15. The process of claim 6, wherein the cyclic amide and catalyst(s) are placed between a top die and a lower die within a press, and the dies of the mold are pressed together to evenly fill the mold with the cyclic amide and catalyst(s).

16. The process of claim 7, wherein the fibrous base material is a fabric, fiber tow, or unidirectional prepreg tape.

17. The process of claim 8, wherein the cyclic amide is continuously melted outside the die and pumped into the die in liquid form.

18. The process of any of claims 6 to 10, wherein at least one filler is present in contact with the cyclic amide.

19. The process of claim 18, wherein the weight of the filler is 0.1 to 70% of the total weight of the reaction mixture of cyclic amide plus catalyst plus filler plus any other additives present.

20. The process of claim 18, wherein the filler is at least one member of the group consisting of boron nitride, fumed silica, titanium dioxide, calcium carbonate, chopped fibers, fly ash, glass microspheres, micro-balloons, crushed stone, nanoclay, linear polymers, and monomers.

* * * * *

UNITED STATES PATENT AND TRADEMARK OFFICE
CERTIFICATE OF CORRECTION

| | | |
|---|---|---|
| PATENT NO. | : 7,635,747 B2 | Page 1 of 1 |
| APPLICATION NO. | : 11/269966 | |
| DATED | : December 22, 2009 | |
| INVENTOR(S) | : Tam et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 974 days.

Signed and Sealed this

Ninth Day of November, 2010

David J. Kappos
*Director of the United States Patent and Trademark Office*